UNITED STATES PATENT OFFICE

2,181,663

DIURETHANE-DIAMINE POLYMERIC MATERIALS

Elmore Louis Martin, Wilmington, Del., assignor to E. I. du Pont de Nemours & Company, Wilmington, Del., a corporation of Delaware No Drawing. Application May 10, 1938, Serial No. 207,159

7 Claims.  (Cl. 260—2)

This invention relates to polymeric materials and more particularly to linear carbamide polymers, i. e., polyamides obtainable from diamines and certain carbonic acid derivatives, and still more particularly to a new method of preparing such polymeric carbamides.

Monomeric carbamides, e. g., amides obtainable from a monoamine and a carbonic acid derivative, have been prepared by the reaction of a monourethane (an ester of a carbamic acid) and a primary or secondary monoamine. The reaction of monoamines and carbonic acid derivatives does not, however, yield polymeric carbamides.

Linear polymethylene carbamides have been described for instance by Fisher in Ber. 46, 2504 (1913) who prepared a polymethylene carbamide by heating a mixture of tetramethylene diamine and carbon dioxide in a closed vessel, and by W. H. Carothers (Patent 2,071,250 and applications Serial Numbers 181 and 74,811 filed January 2, 1935 and April 16, 1936, respectively) who prepared polymeric carbamides by the reaction of diamines and organic carbonates. The products obtained with carbon dioxide are insoluble, infusible and without utility. The production of polymethylene carbamides by the reaction of butyl or m-cresyl carbonate and diamines as disclosed in the mentioned applications is not entirely satisfactory since it is difficult to duplicate results from run to run and in many cases the polymers are difficultly fusible, probably due to a small amount of cross linkage.

This invention has as an object the preparation of linear carbamide polymers. A second object is to provide an improved method for the preparation of such polymers. A further object is to prepare linear carbamide polymers which can be utilized in the manufacture of valuable synthetic fibers. Other objects will appear hereinafter.

These objects are accomplished by the reaction of substantially chemically equivalent quantities of a diurethane of general formula $$R'OOC-NR''-R-NR''-COOR'$$

in which R is a divalent organic radical having a chain length of at least four atoms of which the two terminal atoms are carbon atoms, preferably aliphatic, R' is an univalent hydrocarbon radical and R'' is an univalent hydrocarbon radical or hydrogen, with a diamine of general formula HNR''—R'''—NHR'', in which R'' has previously been defined and R''' is a divalent organic radical having a chain length of at least four atoms of which the two terminal atoms are carbon atoms, preferably aliphatic, under condensation polymerization conditions and preferably for a time sufficient to yield a fiber-forming product.

The difficulties of the previous methods referred to above are overcome by the process of my invention. In carrying out my process for the manufacture of linear carbamide polymers substantially chemically equivalent quantities of a diurethane of general formula $$R'OOC-NR''-R-NR''-COOR'$$

and a diamine of general formula $$HNR''-R'''-NHR''$$

in which R, R', R'', and R''' have previously been defined, are heated under polyamide-forming conditions, i. e., at a temperature of about 150–300° C. Under these conditions, the reaction is reversible and a highly complicated mixture of reactants is obtained. By allowing the volatile product of the reaction, i. e., alcohol, to escape the amidation process continues until a high molecular weight polymer is produced as may be illustrated by the following equation:

$$xR'OOC-NR''-R-NR''-COOR'+xNHR''-R'''-NHR'' \longrightarrow$$
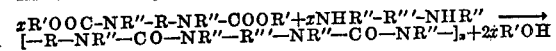

In case R and R''' are identical, a symmetrical carbamide polymer is obtained whose recurring structural unit is $-R-NR''-CO-NR''-$, whereas an unsymmetrical carbamide polymer results when R and R''' are not identical whose recurring structural unit may for convenience be represented as given in the above equation. For the sake of simplicity, the nomenclature of an unsymmetrical carbamide polymer derived from a diamine and a diurethane will designate first, the diamine, and second, the diurethane from which the polymer is derived. Thus, the unsymmetrical polymer obtained by the reaction of hexamethylene diamine and diethyl decamethylene diurethane will be designated as hexamethylene decamethylene carbamide polymer. On the other hand, the symmetrical carbamide polymer obtained by the reaction of decamethylene diamine and diethyl decamethylene diurethane will be designated as decamethylene carbamide polymer.

If the process of this invention is applied to diamines or diurethanes in which the divalent hydrocarbon radical R or R''' has a chain length of less than four atoms, cyclic carbamides are obtained as a result of the reaction of one molecule of a diamine with one molecule of an organic carbonate. This cyclization reaction necessitates the limitation that the divalent hydrocarbon radicals have a chain length of at least four atoms. In order to obtain a polymer which melts without substantial decomposition, it is preferred that the divalent hydrocarbon radicals have a chain length of at least five atoms of which the two terminal atoms are aliphatic.

The diurethanes used in my process for the preparation of polymeric carbamides may be prepared by several methods. A convenient method of preparation consists in the reaction of a diamine and a chlorocarbonate in the presence of aqueous alkali. It may be represented by the following general equation:

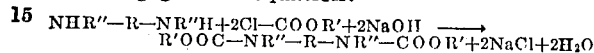

In its preferred embodiment, the polymerization reaction by which the carbamide polymers are formed, i. e., the reaction between the diurethane and the diamine, is continued until the polymer exhibits fiber-forming properties. The optimum time and temperature are determined in part by the nature of the reactants, in part by the melting point of the resulting polymer, and in part by the size of the batch. In the absence of a diluent the reaction is preferably carried out at a temperature above the melting point of the polymeric carbamide. The necessary conditions for the preparation of superpolymers (i. e., the fiber-forming polymers) vary according to the particular case but in all cases the final conditions should be such that if the by-product of the reaction is an alcohol, it is permitted to escape. In practice the conversion to a fiber-forming product is easily tested by merely touching the surface of the molten polymer with a rod and drawing the rod away. If the fiber-forming stage is reached, a continuous filament of considerable strength and pliability is readily obtained. The degree of polymerization may also be followed by determining the intrinsic viscosity of a solution of the polymer in m-cresol as described in British 461,237. Carbamide polymers having an intrinsic viscosity of approximately 0.2, or greater, are generally of sufficiently high molecular weight to yield continuous filaments when tested by the simple method described above. (The products of this invention are spinnable at a lower intrinsic viscosity than polyamides derived from acids other than carbonic. This may be because the melt viscosity of a polymer of this invention whose intrinsic viscosity is 0.2 corresponds to the melt viscosity of other polyamides having an intrinsic viscosity of about 0.6.) The heat treatment necessary to obtain products qualified for spinning must be determined for each polymer as inferior products result if the heat treatment is continued for periods of too long or too short duration.

The following examples, in which the quantities of reagents are parts by weight, are illustrative of the methods used in carrying out my invention:

*Example I*

To a solution of 58 parts of hexamethylene diamine in 200 parts of diethyl ether was added dropwise and simultaneously 130 parts of ethyl chlorocarbonate and 480 parts of a 10% solution of sodium hydroxide, the temperature being kept below 10° C. by external cooling. The crystals of diethyl hexamethylene diurethane,

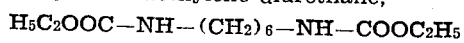

were collected, washed thoroughly with cold water and purified by crystallization from benzene-petroleum ether.

The polymeric carbamide was prepared by gradually heating a mixture of 9.579 parts of decamethylene diamine, 14.503 parts of diethyl hexamethylene diurethane and 10 parts of m-cresol in a closed vessel to a temperature of 200° C. during one hour and then the temperature was increased to 235° C. during three hours. After cooling, the vessel was opened and the heat treatment was continued for two hours at a temperature of 255° C. and at a pressure of 5 mm., during which time the condensation reached the desired stage and the polymer was freed of m-cresol.

The decamethylene hexamethylene carbamide polymer

thus formed was a hard, rather tough, opaque solid which melted to a viscous liquid at about 170° C. The polymer could be drawn into long continuous filaments by touching the molten polymer with a rod and withdrawing the rod. The intrinsic viscosity of a solution of the polymer in m-cresol was 0.21. The polymer is insoluble in the more common solvents under ordinary conditions, but is soluble in formic acid and in phenol. The polymer can be formed into clear, transparent sheets which possess considerable strength and pliability.

*Example II*

Following the general procedure as outlined in Example I, a solution of 3.293 parts of hexamethylene diamine and 8.971 parts of diethyl decamethylene diurethane in 5 parts of m-cresol was heated in a closed reaction vessel, the temperature being raised to 200° C. during the course of one hour and then the temperature was gradually increased to 220° C. during a period of three hours. After cooling, the vessel was opened and the heat treatment was continued for two hours at a temperature of 225° C. and at a pressure of 5 mm. during which time the condensation reached the desired stage and the polymer was freed of m-cresol.

The hexamethylene decamethylene carbamide polymer,

thus formed was a hard, rather tough, opaque solid which melted to a viscous liquid at about 170° C. The intrinsic viscosity of the polymer in m-cresol was 0.23 and the polymer appeared identical in every respect with the polymer obtained in Example I.

The polymer was spun into continuous filaments of fairly uniform diameter by extruding the molten polymer at 250° C. under gas pressure from a spinneret having an orifice 0.015 inch in diameter. The undrawn filaments had a denier of 21, a tensile strength in grams per denier at break of 3.2, and by the action of stress could be permanently stretched, elongated or "cold-drawn" as much as 110%.

*Example III*

Following the general procedure as outlined in Examples I and II, a mixture of 5.380 parts of decamethylene diamine, 9.882 parts of diethyl decamethylene diurethane and 5 parts of m-cresol in a closed reaction vessel was heated to 200° C. during one-half hour and then the heating was continued for three hours at a temperature of 220° C. After cooling, the condensation polymerization was continued at a temperature of 255° C. and at a pressure of 5 mm. for two hours.

The polymer thus obtained was a hard, rather tough opaque solid which melted to a clear viscous liquid at 210° C. The intrinsic viscosity of a solution of the polymer in m-cresol was 0.28. It was insoluble in common solvents under ordinary conditions but was soluble in formic acid and in hot phenol. Long continuous filaments were produced by touching the molten polymer with a rod and withdrawing the rod. The filaments could be "cold-drawn" into strong, pliable, elastic, highly oriented fibers suitable for the manufacture of fabrics.

*Example IV*

Following the general procedure as outlined in the above examples, a mixture of 3.002 parts of 3-methylhexamethylene diamine, 6.017 parts of diethyl hexamethylene diurethane and 5 parts of m-cresol in a closed vessel was heated gradually to 210° C. during three-quarters of an hour and then at 225° C. for an additional period of two hours. The condensation was continued by heating at 218° C. under reduced pressure for one-half hour and then at 255° C. for three hours, during which time the m-cresol was also removed.

The 3-methylhexamethylene hexamethylene carbamide polymer,

[—(CH$_2$)$_3$—NH—CO—NH—(CH$_2$)$_2$—
CHCH$_3$—(CH$_2$)$_3$—NH—CO—NH—(CH$_2$)$_3$—]$_x$ melted to a clear, viscous liquid at 210° C. and long continuous filaments were obtained by touching the molten polymer with a rod and withdrawing the rod. The intrinsic viscosity of a solution of the polymer in m-cresol was 0.30.

*Example V*

A mixture of 1.468 parts of N, N'-dimethyl hexamethylene diamine, 2.649 parts of diethyl hexamethylene diurethane and 2 parts of m-cresol in a closed reaction vessel was heated to 200° C. during two hours and then the heating was continued for one hour at 240° C. Heating first at 218° C. under reduced pressure during five hours and then at 255° C. during two hours gave N, N'-dimethylhexamethylene hexamethylene carbamide polymer,

[—(CH$_2$)$_3$—NH—CO—NCH$_3$—(CH$_2$)$_3$—]

The polymer softened at about 60° C. and melted to a clear, viscous liquid at 90° C. from which continuous filaments were obtained by touching the molten polymer with a rod and withdrawing the rod. The intrinsic viscosity of a solution of the polymer in m-cresol was 0.20.

*Example VI*

A mixture of 12.37 parts of decamethylene diamine and 18.70 parts of diethyl hexamethylene diurethane was heated under an atmosphere of oxygen-free nitrogen in an open vessel during three hours at a temperature of 202° C. The decamethylene hexamethylene carbamide polymer prepared by this procedure appeared to be identical in every respect with the polymers described in Examples I and II. The intrinsic viscosity of the polymer in m-cresol was 0.35.

In place of the diurethanes used in the preparation of the carbamide polymers of the above examples, I may use other diurethanes of formula R'OOC—NR''—R—NR''—COOR', in which R, R' and R'' have been previously defined. As additional examples of such diurethanes might be mentioned:

H$_5$C$_2$OOC—NH—(CH$_2$)$_2$—CHCH$_3$—(CH$_2$)$_2$—NH—COOC$_2$H$_5$
C$_6$H$_5$OOC—NH—(CH$_2$)$_6$—NH—COOC$_6$H$_5$
H$_3$COOC—NH—CH$_2$—C$_6$H$_4$—CH$_2$—NH—COOCH$_3$
H$_5$C$_2$OOC—NCH$_3$—(CH$_2$)$_6$—NCH$_3$—COOC$_2$H$_5$
H$_5$C$_2$OOC—NH—(CH$_2$)$_2$—O—(CH$_2$)$_2$—NH—COOC$_2$H$_5$
H$_5$C$_2$OOC—NH—CHCH$_3$—(CH$_2$)$_4$—CHCH$_3$—NH—COOC$_2$H$_5$
H$_5$C$_2$OOC—NH—(CH$_2$)$_2$—S—(CH$_2$)$_2$—NH—COOC$_2$H$_5$ and

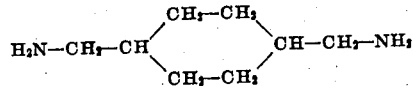

In place of the diamines which are reacted with the diurethanes of formula

H$_5$C$_2$OOC—NH—R—NH—COOC$_2$H$_5$ of the above examples, I may use any diamine of formula R''NH—R'''—NHR'', in which R'' and R''' have previously been defined. Among the diamines which may be used are the following:

H$_2$N—(CH$_2$)$_8$NH$_2$
H$_2$N—CHCH$_3$—(CH$_2$)$_5$—CHCH$_3$—NH$_2$
H$_2$N—CH$_2$—C$_6$H$_4$—CH$_2$—NH$_2$

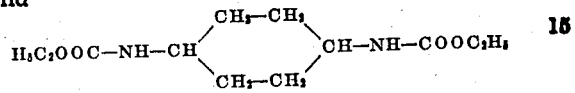

H$_2$N—(CH$_2$)$_2$—O—(CH$_2$)$_2$—O—(CH$_2$)$_2$—NH$_2$ and

H$_3$CNH—(CH$_2$)$_{10}$—NHCH$_3$

In the preparation of carbamide polymers of this invention, the diurethane and the diamine may be heated to a suitable reaction temperature, generally 150°–300° C., and preferably at 180°–250° C., in a closed or open vessel in the presence or absence of a diluent (solvent or non-solvent). In the final stage of the reaction, the conditions for the production of a fiber-forming product should be such that if the by-product of the reaction is an alcohol, it is permitted to escape. Suitable solvents in which to carry out the reaction are phenol, m-cresol, and o-hydroxydiphenyl. Preferably the reaction should be carried out in the absence of oxygen. This can be done by operating in the presence of an inert gas, such as nitrogen. The polymer may be freed of solvent by direct distillation of the solvent under reduced pressure or the polymer may be precipitated by the addition of a solvent in which the polymer is insoluble, such as ethyl acetate, acetone, alcohol or dilute alkali. Final traces of the phenolic solvent may be removed from the precipitated polymer by extracting with hot alcohol, acetone or ethyl acetate or by heating the polymer under reduced pressure at a temperature slightly above the melting point of the polymer.

It is also within the scope of this invention to control the extent of the condensation polymerization by using a slight excess of either the diurethane or the diamine or by the addition of a small amount of a monofunctional amide-forming reactant (acid, ester, anhydride, amide, amine) or by a combination of both methods. Polymers prepared in this way are referred to as "viscosity stable polymers". Stabilization of the polymer is especially desirable if the polymer is to be spun into continuous filaments from melt as an increase in molecular weight during the spinning process increases the melt viscosity and makes the manufacture of filaments of uniform denier more difficult. A catalyst, e. g., a metal or metal salt may be used in the preparation of the polymer but in general no added catalysts are needed. Examples of such materials are inorganic compounds of alkaline reaction such as oxides and carbonates and acidic compounds, such as halogen salts of polyvalent metals.

Continuous filaments may be obtained in a number of ways. The polymer may be dissolved in a suitable solvent and the solution extruded through orifices into a coagulating bath, the resulting filaments being continuously collected on a suitable bobbin. The extruded filaments may also be passed through a heated chamber where the solvent is removed by evaporation. As indicated in the examples, the filaments can also be prepared by melt spinning. The diameter of the filaments may be regulated by controlling the temperature of the molten mass, the pressure used to extrude the polymer, the rate of reeling, the size of the orifice, and the degree of polymerization. The filaments are capable of being cold drawn, that is, drawn to substantial permanent increase in length at temperatures below their melting point, and after cold drawing the fibers thus obtained can be woven into cloth and show under X-ray examination the molecular orientation along the fiber axis that is characteristic of natural fibers.

Although the preferred embodiment comprises heating the reactants until they exhibit fiber-forming properties, it is within the scope of this invention to discontinue heating before this stage is reached. The low molecular weight or non-fiber-forming polymers are useful for certain applications, e. g., molding and coating compositions.

The polyamides of this invention are adapted in most part to the uses described for the polyamides disclosed in Patents 2,071,251, 2,071,252, and 2,071,253. The uses of the polymeric carbamides include the production of strong oriented fibers which are used as artificial silk, artificial hair, bristles, threads, filaments, yarn, ribbon and films. In addition the unusual properties of unsymmetrical polymeric carbamides adapt them to the production of sheeted materials for use in the manufacture of safety glass as they have the capacity to be molded into clear, tough sheets and stick tenaciously to glass. Unsymmetrical polymeric carbamides may also be used as an adhesive for the manufacture of safety glass from other polymers. In these or other uses, they may be used alone or in admixture with other materials, e. g. resins, plasticizers, pigments, antioxidants, dyes, etc. If desired these materials can be incorporated in the polymeric amides by incorporation with the monomeric reactants from which the polymer is prepared.

This invention provides an improved process for the preparation of polymeric carbamide as it is possible to duplicate results from run to run. By the method of this invention it is possible to prepare polymeric carbamides in which each nitrogen atom of the carbamide linkage carries unlike hydrocarbon groups and such carbamides possess very unusual and valuable properties.

As many apparently widely different embodiments of this invention may be made without departing from the spirit and scope thereof, it is to be understood that I do not limit myself to the specific embodiments thereof except as defined in the appended claims.

I claim:

1. A process which comprises reacting in substantially chemically equivalent proportions a diurethane and a diamine under condensation polymerizing conditions, said diurethane being of the general formula $$R'OOC-NR''-R-NR''-COOR'$$

and said diamine being of the general formula $HNR''-R'''-NHR''$, R and R''' being divalent organic radicals having terminal carbon atoms and a chain of at least two atoms separating said terminal carbon atoms, R' an univalent hydrocarbon radical, and R'' a constituent selected from the class consisting of an univalent hydrocarbon radical and hydrogen.

2. The process set forth in claim 1 in which the two terminal atoms of said radicals R and R''' are aliphatic.

3. The process set forth in claim 1 in which R and R''' are hydrocarbon radicals in which the terminal atoms are aliphatic.

4. The process set forth in claim 1 in which said diurethane and diamine are reacted by heating at a temperature of from about 150° C. to about 300° C.

5. The process set forth in claim 1 in which the polymerization conditions are maintained until the polymer obtained is capable of being formed into useful fibers.

6. The process set forth in claim 1 in which the polymerization conditions are maintained until the polymer has an intrinsic viscosity of at least 0.2.

7. The process set forth in claim 1 in which R' is an alkyl radical and in which said diurethane and diamine are reacted by heating under conditions permitting the escape of the alcohol formed in the reaction.

ELMORE LOUIS MARTIN.

CERTIFICATE OF CORRECTION.

Patent No. 2,181,663. November 28, 1939.

ELMORE LOUIS MARTIN.

It is hereby certified that error appears in the printed specification of the above numbered patent requiring correction as follows: Page 2, second column, line 44, for "225° C." read 255° C.; and that the said Letters Patent should be read with this correction therein that the same may conform to the record of the case in the Patent Office.

Signed and sealed this 26th day of December, A. D. 1939.

(Seal)

Henry Van Arsdale,
Acting Commissioner of Patents.